United States Patent [19]

Digilio et al.

[11] 3,999,747
[45] Dec. 28, 1976

[54] RECORD CARD FEEDING APPARATUS

[75] Inventors: Frank A. Digilio, New Hartford; Peter F. Mathews, Frankfort; James H. Roberts, West Winfield; Donald R. Morreall, New Hartford; Douglas J. Reittinger, Oriskany, all of N.Y.

[73] Assignee: Mohawk Data Sciences Corporation, Herkimer, N.Y.

[22] Filed: July 17, 1974

[21] Appl. No.: 489,287

[52] U.S. Cl. .................................. 271/135; 74/42; 214/8.5 B; 214/8.5 H; 271/115; 271/138; 271/139; 271/143; 271/225

[51] Int. Cl.² ................... B65H 3/24; B65H 3/46

[58] Field of Search .............. 271/131–144, 271/4, 10, 225, 115, 119, 37, 38, 266; 214/8.5 B, 8.5 H; 74/42

[56] References Cited
UNITED STATES PATENTS

| | | | |
|---|---|---|---|
| 1,377,810 | 5/1921 | De Escobales | 271/135 |
| 2,877,017 | 3/1959 | Luning et al. | 271/143 X |
| 3,160,411 | 12/1964 | Fiehl | 271/4 |
| 3,218,063 | 11/1965 | Boyce | 271/135 |
| 3,391,927 | 7/1968 | Strack | 271/140 |
| 3,506,258 | 4/1970 | Lindquist | 271/119 |
| 3,917,258 | 11/1975 | Miller | 271/225 X |

*Primary Examiner*—Evon C. Blunk
*Assistant Examiner*—Bruce H. Stoner, Jr.
*Attorney, Agent, or Firm*—Robert R. Hubbard

[57] ABSTRACT

Apparatus for feeding data processing record cards seriatim from the bottom of a stack to a data sensing station or the like including a pair of oscillating picker members for displacing a record card from the bottom of the stack, and a pair of sector rollers for intermittently gripping the displaced card and moving it at right angles to the direction of displacement to the nip of a set of feed rollers. Both the picker members and sector rollers are driven from a common source, the picker members being harmonically driven through a unique coupling device including a pair of flexural elements mounted at right angles to each other to give a universal action.

8 Claims, 4 Drawing Figures

RECORD CARD FEEDING APPARATUS

This invention relates to drive mechanisms, and, more particularly, to drive mechanisms suitable for use in data processing record card feeding apparatus.

Certain conventional record card feeders are designed to feed punched record cards or the like from the bottom of a stack in row-by-row fashion. After being picked from the bottom of the stack, the record card is typically transported past a data sensing or reading station, also in row-by-row fashion, so as to convert the information represented by the punched holes in the card into electrical signals suitable for input to an electronic data processing machine. Although the row-by-row card feeding arrangement permits a somewhat simplified mechanical card feeding apparatus, the row-by-row reading of the data requires information storage capacity in order to assemble the information stored on the record card prior to converting it to electrical signals.

In order to reduce or eliminate the need for information storage capacity, column-by-column, or serial, reading or sensing of data processing record cards has been adopted. Because serial reading of record cards presents the information to the reading station in byte-by-byte fashion, information storage capacity is not needed because each byte presented to the reading station can be immediately converted into binary electrical signals for input to the electronic data processing machine.

However, serial feeding of punched record cards from the bottom of a stack presents considerable mechanical difficulties in that the rough edges of the punched holes of the bottom card of the stack tend to catch on the edges of the punched holes of the card immediately above it. As a result, the effective frictional forces resisting the serial picking and feeding of the bottom card of the stack may be quite large. Moreover, in the extreme case, tearing of the card web may result from the catching of the punched hole edges of adjacent cards.

One arrangement that has been employed in the prior art to obtain the benefit of serial card reading while avoiding the disadvantages of serial card feeding from a stack has been to pick and feed the card from the bottom of the stack in row-by-row fashion to a holding station, and then feed the card serially from the holding station past the reading station. However, it is apparent that this technique involves additional mechanical complexity of the card feeding apparatus and requires somewhat more space in order to accommodate the holding station.

It is therefore an object of this invention to obviate the problems of the prior art data processing card feeding apparatus.

More particularly, it is an object of this invention to provide improved apparatus for row-by-row picking and serial feeding of data processing cards.

It is also an object of this invention to provide an improved drive mechanism for a row-by-row picking and serial feeding apparatus.

It is another object of this invention to provide a simplified drive mechanism for a data processing card picking and feeding apparatus which requires a minimum of maintenance.

According to the above and other objects, the present invention provides an improved drive mechanism for record card feeding apparatus in which the bottom card of a stack is first displaced in the row-by-row direction by an amount sufficient that the rows of punched holes in the bottom card lie between the rows of punched holes in the card above it in the stack so that the edges of the punched holes do not catch on each other. The protruding edge of the bottom card is then gripped by sector rollers which feed it in the serial direction into the nip of feed rollers, which serve to transport the card past the reading station. A single rotating drive source drives the sector rollers through a timing belt and is coupled to the picker members through an eccentric and a unique coupling device including two flexural elements for converting the rotating eccentric motion to the reciprocating harmonic motion of the picker members.

Other objects and advantages of the present invention will be apparent from the following detailed description and accompanying drawings which set forth, by way of example, the principle of the present invention and the best mode contemplated for carrying out that principle.

IN THE DRAWINGS

Figure 1:
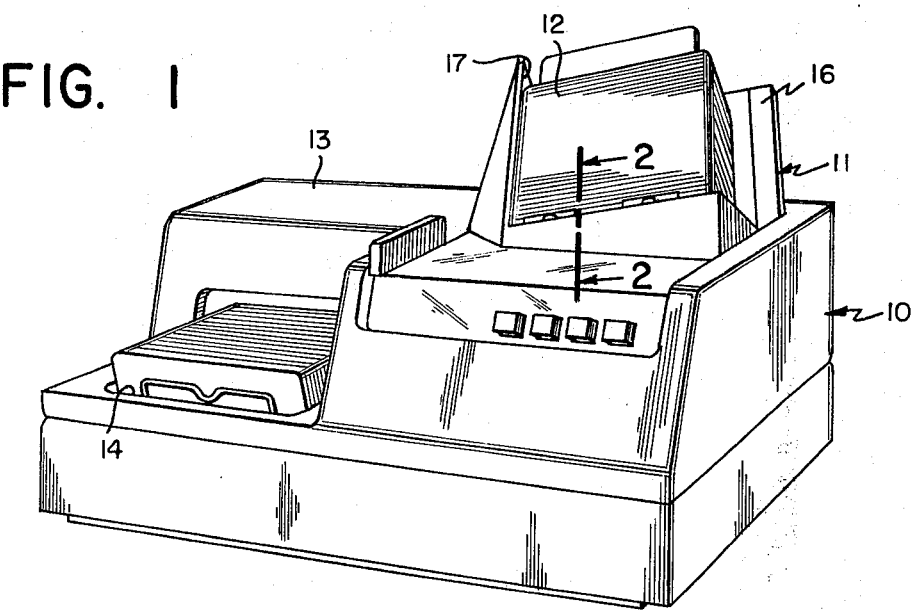
FIG. 1 is a perspective view of a data processing card reading incorporating the record card picking and feeding drive mechanism of the present invention.

Referring in detail to the drawings, FIG. 1 is a perspective view of a preferred embodiment of the data processing record card reader, generally designated 10, incorporating the record card picking and feeding drive mechanism of the present invention. The input hopper 11 of card reader 10 is preferably arranged to hold the input card stack 12 at an angle to the vertical as shown in order to permit loading of the card stack "on the fly." Additional cards loaded onto the top of the stack 12 tend to square themselves off against the rear 16 and end 17 of the hopper 11 under the influence of the normal vibrations caused by the operation of the picking and feeding mechanism of the card reader. In addition, the fact that the card stack 12 is held at an angle to the vertical reduces the normal force on the bottom record card due to the weight of the card stack and thus reduces the effective frictional forces which would tend to impede the picking and feeding of the bottom card.

After the data processing cards are picked and fed from the bottom of input stack 12, they are transported past a reading or sensing station within the cabinet 13 and are deposited in output hopper 14. It will be appreciated that the card picking and feeding mechanism of the present invention is contained within the cabinet 13, and that the overall view of the card reader 10 shown in FIG. 1 is provided so that the present invention may be understood in its proper context.

Figure 4:
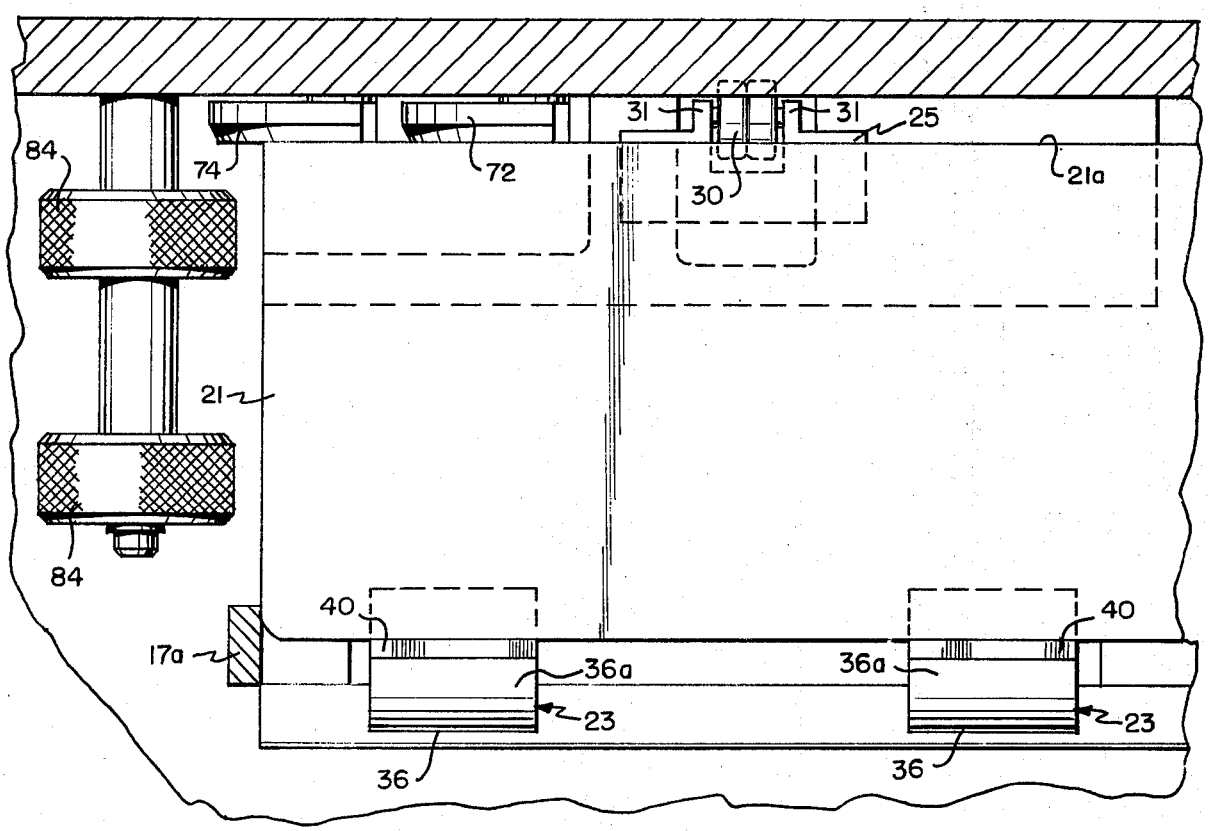
FIG. 4 is a cross sectional view of the drive mechanism taken along the line 4—4 of FIG. 3.
Figure 2:
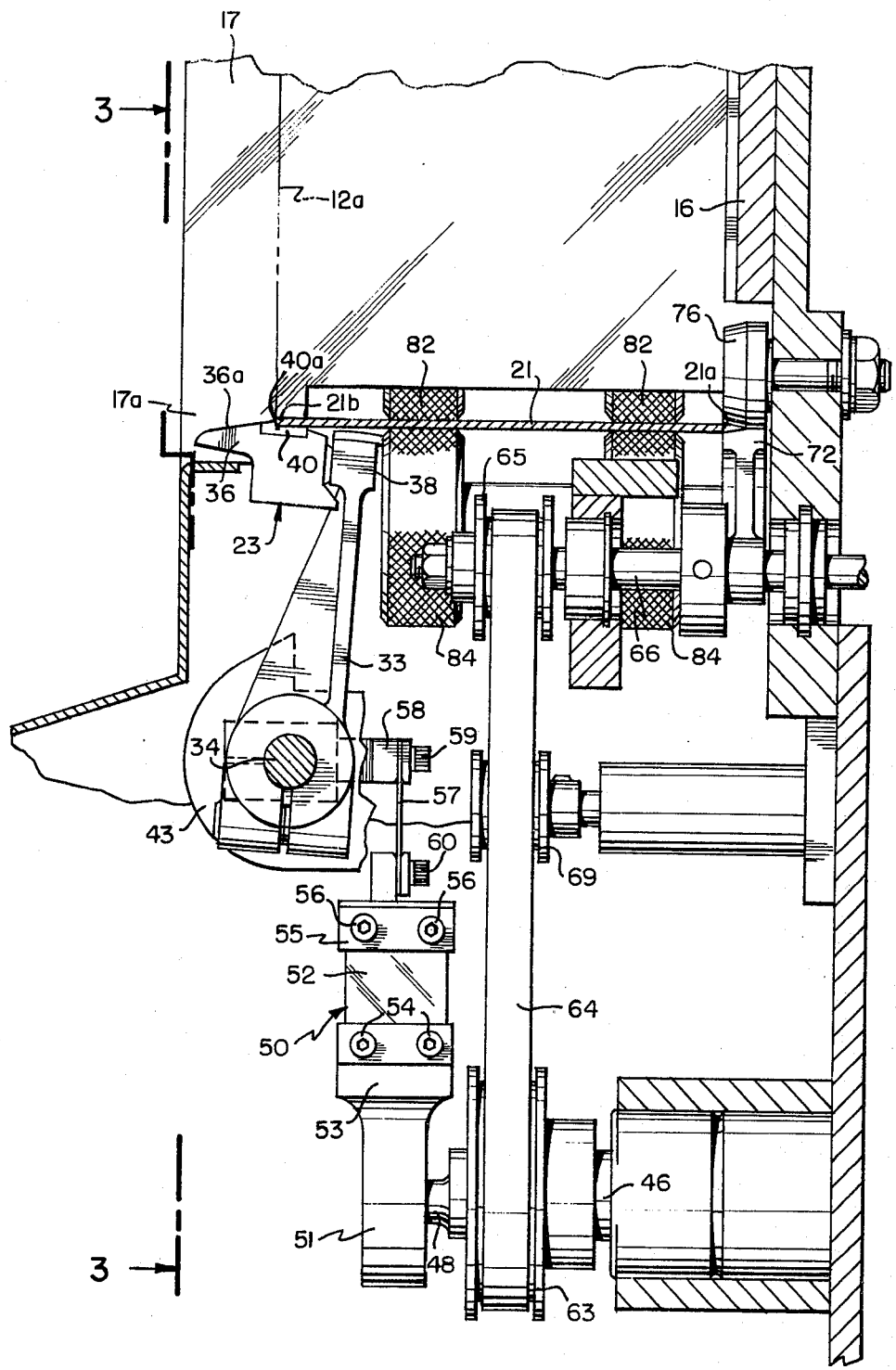
FIG. 2 is an enlarged cross sectional view of the drive mechanism taken along the line 2—2 of FIG. 1.
Figure 3:
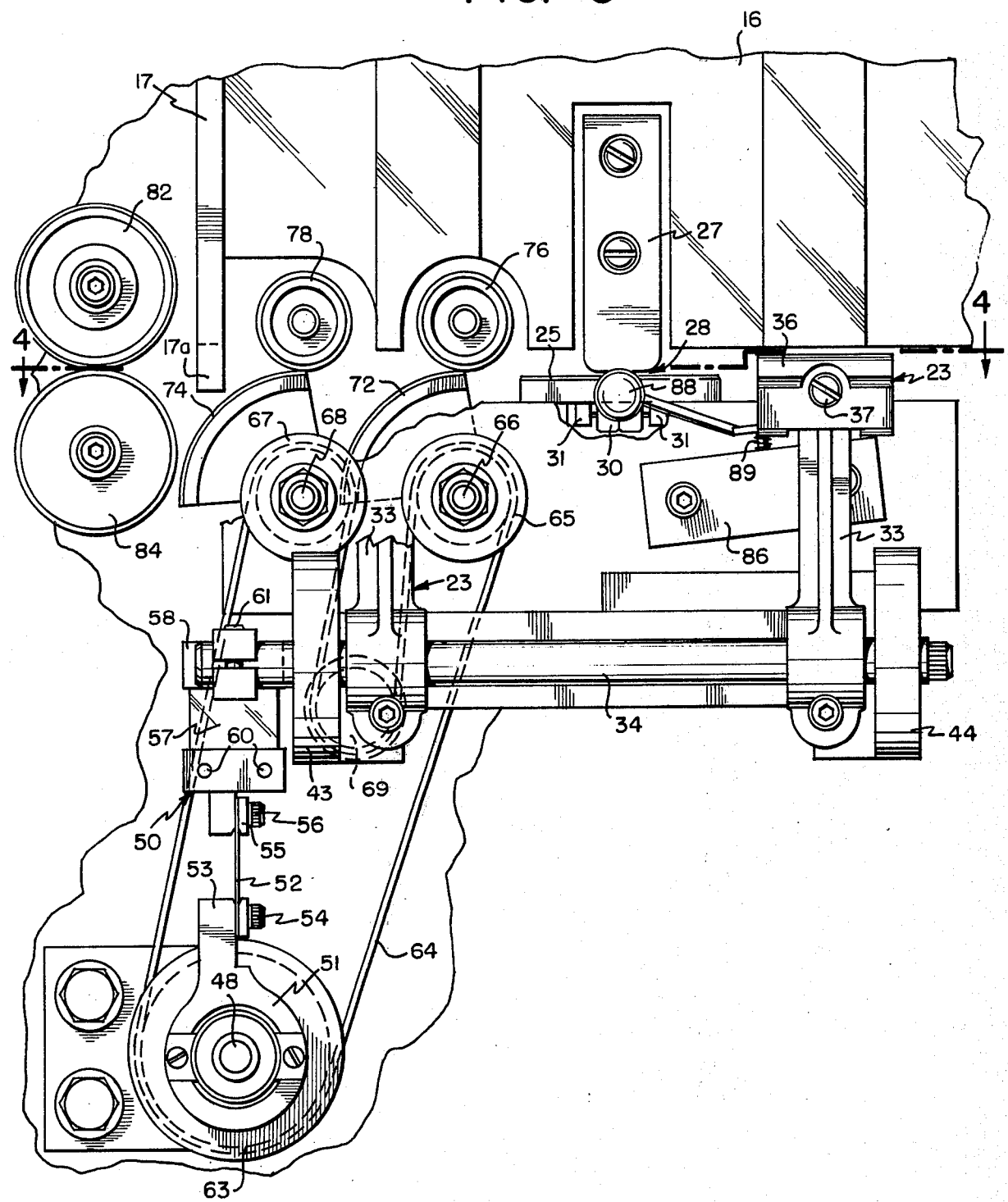
FIG. 3 is a cross sectional view of the drive mechanism taken along the line 3—3 of FIG. 2.

The card picking and feeding mechanism of the present invention is shown in detail in FIGS. 2, 3 and 4. FIG. 2 is an enlarged cross sectional view of the drive mechanism taken along the line 2—2 of FIG. 1, FIG. 3 is a cross sectional view taken along the line 3—3 of FIG. 2, and FIG. 4 is a cross sectional view taken along the line 4—4 of FIG. 3. In order that the various elements of the mechanism can be more clearly illustrated, only a single data processing card 21 is shown.

Card 21 is the bottom card of the input stack which is represented by the phantom line 12a in FIG. 2.

The input record card stack 12a is supported by the two card picker members 23 and by the bedplate 25 shown in FIGS. 3 and 4. The rear wall 16 shown in FIG. 3 and end wall 17, shown in FIG. 2, support the long and short sides respectively of the input card stack. Adjustably secured to the lower central portion of rear wall 16 is a throat knife 27 which depends into and restricts the throat passage 28 sufficiently to tend to prevent movement of all but the bottom record card 21 through said passage 28. The throat roller 30 is disposed slightly more than one card thickness directly below the throat knife 27 and journalled in a support 31 carried by the bedplate 25. When the bottom card 21 is "picked" or displaced from the bottom of the input card stack by picker members 23, the forward edge 21a of card 21 moves over throat roller 30 and into throat 28. Throat knife 27 is adjusted so as to permit only the bottom card 21 to enter throat 28 and to prevent the next lowest card from being carried along by friction.

Each card picker member 23 comprises a rocker arm 33 clamped near its lower end to a shaft 34 so as to be oscillated thereby as said shaft 34 is rocked. A swivel block or head 36 is swivelly mounted on a bolt 37 adjustably screw-threaded laterally into the outer end portion 38 of each rocker arm 33.

A picker knife 40 is secured to the upper surface of each swivel block 36 so as to swivel therewith. Each picker knife 40 provides a knife edge 40a for engaging the trailing edge 21b of the bottom card 21 and thus move the card 21 into the throat 28.

The upper surface 26a of swivel block 36 supports the card stack during the period after the bottom card 21 is engaged by the picker knife edge 40a during the forward stroke of card picker members 23 until the card picker members 23 move rearward of the trailing edge of the card stack during the return stroke.

Shaft 34 is journalled on suitable supports 43 and 44 which are mounted on the frame of the machine. Oscillating or rocking motion is imparted to the shaft 34 from the rotating drive shaft 46 by means of a unique coupling device, generally designated 50. Coupling device 50 includes a journal member 51 which is mounted on an eccentric pin 48 projecting from the end of drive shaft 46 whereby the rotating motion of drive shaft 46 is converted to eccentric motion of the journal member 51.

A first flexural member 52 is mounted on the upwardly extending portion 53 of journal member 51 by suitable means such as machine screws 54. The flexural member 52 is preferably made of spring steel or other suitable material and extends radially outward from journal member 51. That is, the plane of flexural member 52, if extended, would include the axis of eccentric pin 48.

A mounting member 55 is clamped or otherwise attached to the upper end of flexural member 52 by suitable means such as machine screws 56 and a second flexural member 57 is clamped to mounting member 55 by means of machine screws 58. The second flexural member 57 is preferably made of the same material as the first flexural member 52, i.e., spring steel or the like. As shown in FIGS. 2 and 3, the plane of flexural member 57 is oriented perpendicular to the axis of eccentric pin 48.

A connecting member 58 is mounted at the upper end of flexural member 57 by suitable means such as machine screws 59. Connecting member 58 extends perpendicular to the plane of flexural member 57 and is firmly clamped to shaft 34 by a machine screw 61.

From the foregoing description, it will be appreciated by those skilled in the art that the two flexural members 52 and 57 mounted at right angles to each other provide a universal action which enables coupling device 50 to convert the rotational motion of drive shaft 46 to the oscillatory motion of shaft 34. Moreover, coupling device 50 accomplishes this result in a far simpler and less expensive way than is possible through the use of conventional mechanisms. Further coupling device 50 requires less maintenance and has a longer operating life than conventional mechanisms designed to accomplish the same function.

Referring again to FIGS. 2 and 3 of the drawings, a drive wheel 63 is mounted on drive shaft 46. Drive wheel 63 is connected by an endless belt 64 to wheels 65 and 67 mounted on shafts 66 and 68 respectively which are suitably journalled and supported by the frame of the machine. An idler wheel 69 is provided in order to lead endless belt 64 around greater portions of the circumferences of wheels 65 and 67. The inner surface of belt 64 is preferably toothed and the circumferences of wheels 63, 65 and 67 are preferably slotted in order to provide a more positive timing relationship between drive shaft 46 and shafts 66 and 68.

Shaft 66 carries a sector roller 72 and shaft 68 carries a sector roller 74. An idler roller 76 is journalled on the frame of the machine in a position to cooperate with sector roller 72 to grip the upper and lower surfaces respectively of record card 21 adjacent its leading edge 21a when the record card 21 is displaced into throat 28 by card picker members 23. Similarly, idler roller 78 is journalled on the frame of the machine in a position to cooperate with sector roller 74. The gripping surfaces of sector rollers 72 and 74 and idler rollers 76 and 78 are preferably covered with rubber or similar material in order to increase their gripping effect.

The action of sector rollers 72 and 74 propels the bottom card 21 into the nip of feed rollers 82 and 84, the circumferences of which are also preferably covered with rubber or other similar material in order to increase their gripping effect. Feed rollers 82 and 84 are driven by a suitable drive means, not shown, and serve to complete the withdrawal of the card 21 from the bottom of the input stack 12a and to feed it past the information reading station, also not shown.

A portion 17a of end wall 17 of hopper 11 depends downward to prevent record cards which have not been displaced into throat 28 from entering into the nip of rollers 82 and 84. Projection 17a thus prevents the card immediately overlying the bottom card 21 from being carried along with the bottom card 21 into the nip of rollers 82 and 84.

It will be appreciated by those skilled in the art that, for proper functioning, the surface velocities of sector rollers 72 and 74 must equal the surface velocities of feed rollers 82 and 84. In the preferred form of the present card feeding apparatus, this is accomplished by causing the sector rollers 72 and 74 to revolve twice for each revolution of the drive shaft 46. The advantage of this arrangement is that smaller, and therefore less massive sector rollers can be made to provide the same surface velocity as larger, more massive sector rollers without the disadvantage that the greater inertia of larger sector rollers would entail in connection with the starting and stopping of the mechanism.

It will be appreciated that the relative speeds of sector rollers 72 and 74 and drive shaft 46 is determined by the relative diameters of wheels 65 and 67 and drive wheel 63. It will likewise be apparent to those skilled in the art that the phase relationship between sector rollers 72 and 74 and card feed members 23 can be adjusted in a number of ways including, for example, adjusting the angular relation between drive wheel 63 and eccentric pin 48. The preferred phase relationship provides that card picker members 23 shall have completed their forward stroke displacing the leading edge 21a of bottom card 21 into throat 28 just before the sector rollers 72 and 74 come around into position to grip card 21.

The record card feeding apparatus of the present invention may be provided with a pressure switch connected to the drive motor for stopping the operation of the card feeding mechanism when the hopper 11 is empty. For example, FIG. 3 shows a switch 86 having a spring biased actuator 88 for contacting the bottom card of the stack held by hopper 11. When the hopper is empty actuator 88 moves upward in response to its bias spring 89 thus shutting of the drive motor or releasing a clutch (not shown) and stopping the card feed mechanism.

Although the card feeding mechanism of the present invention may be used to feed record cards or forms of a number of different types, it will be appreciated that the present card feeding mechanism is particularly useful in connection with punched data processing cards because the initial displacement of the record card 21 by the forward stroke of card picker members 23 is preferably just sufficient to offset the rows of punched holes of the bottom card from the rows of punched holes of the card lying next above it, thereby greatly reducing the forces impeding the feeding of the bottom card 21 into the nip of feed rollers 82 and 84. An initial displacement of the bottom record card 21 by about ⅜ of an inch by the forward stroke of the picker members 23 will accomplish the purpose of offsetting the rows of punched holes in a standard data processing record card.

While the principle of the present invention has been illustrated by reference to a preferred embodiment of record card feeding apparatus, it will be appreciated by those skilled in the art that various modifications and adaptations of the preferred embodiment may be made without departing from the spirit and scope of the present invention as defined with particularity in the appended claims.

What is claimed is:
1. Apparatus for feeding record cards from the bottom of a stack, said apparatus comprising:
    a throat for receiving a first edge of the bottom record card of a stack; a rotating drive member;
    an oscillatable picker means for engaging the edge of said bottom card opposite said first edge and moving said bottom card in a direction perpendicular to said first edge so that said bottom card enters a predetermined distance into said throat; said oscillatable picker means including
        an oscillatable shaft skewed at right angles to the axis of rotation of the rotating drive member;
        a rocker arm having one end mounted on said shaft;
        a swivel head mounted at the other end of said rocker arm; and
        a picker knife mounted on said swivel head, said picker knife being adapted to engage the edge of said bottom card of said stack opposite said first edge;
    coupling means connecting said drive member to said picker means for converting the rotating motion of said drive member to oscillating motion of said picker means; said coupling means including
        an eccentric pin mounted on said rotating drive member;
        a journal member journalled on said eccentric pin;
        a first planar flexural member mounted on said journal member and extending radially therefrom
        a second planar flexural member mounted on said first planar flexural member, the plane of said second planar flexural member being perpendicular to the axis of said eccentric pin; and
        means connecting said second planar flexural member to said oscillatable shaft, whereby eccentric rotational motion of said journal member is converted to oscillating motion of said oscillatable shaft;
    a sector roller for intermittently engaging a surface of said bottom card adjacent said first edge when said bottom card has entered said predetermined distance into said throat; and
    timing means connecting said drive member to said sector roller to cause said sector roller to feed said bottom card in a direction parallel to said first edge.

2. The record card feeding apparatus of claim 1 further comprising a hopper for holding said stack of record cards, said hopper including a rear wall for contacting the first edges of said record cards and an end wall perpendicular to said rear wall.

3. The record card feeding apparatus of claim 2 wherein said hopper is oriented to hold said stack of record cards at an angle to the vertical so as to reduce the normal force on said bottom card due to the weight of said stack of record cards and thereby reduce frictional forces tending to impede movement of said bottom card.

4. The record card feeding apparatus of claim 3 wherein said hopper is oriented so that the edges of said record cards rest against said rear wall and said end wall of said hopper whereby record cards placed in said hopper tend to become registered for proper feeding.

5. The record card feeding apparatus of claim 4 wherein said throat is defined by an adjustable throat knife mounted on said rear wall of said hopper.

6. The record card feeding apparatus of claim 4 further comprising:
    an opening at the base of said end wall of said hopper through which said bottom card is fed by said sector roller, said end wall having a depending portion spaced from said rear wall of said hopper a distance less than the width of a record card to prevent record cards which have not been moved into said throat from being carried through said opening.

7. The record card feeding apparatus of claim 6 further comprising:
    a set of feed rollers mounted on the opposite side of said end wall from said record card stack such that said bottom card is fed by said sector roller through said opening into the nip of said set of feed rollers.

8. The record card feeding apparatus of claim 6 wherein said predetermined distance that said bottom card is moved by said picker means comprises approximately ⅜ of an inch.

* * * * *